US011766038B2

(12) United States Patent
Steinman et al.

(10) Patent No.: US 11,766,038 B2
(45) Date of Patent: Sep. 26, 2023

(54) ORGAN TRANSPORTER WITH OXYGEN GENERATION

(71) Applicant: LIFELINE SCIENTIFIC, INC., Itasca, IL (US)

(72) Inventors: Christopher P. Steinman, Sandy, UT (US); David Kravitz, Barringhton Hills, IL (US); Aaron R. Ferber, Chicago, IL (US); Ross Lockwood, Chicago, IL (US); Rodney H. Monson, Waukegan, IL (US); Evan D. Shapiro, Chicago, IL (US)

(73) Assignee: LIFELINE SCIENTIFIC, INC., Itasca, IL (US)

( * ) Notice: Subject to any disclaimer, the term of this patent is extended or adjusted under 35 U.S.C. 154(b) by 0 days.

(21) Appl. No.: 14/964,868

(22) Filed: Dec. 10, 2015

(65) Prior Publication Data

US 2016/0088834 A1    Mar. 31, 2016

Related U.S. Application Data

(63) Continuation of application No. 13/545,514, filed on Jul. 10, 2012, now abandoned.

(51) Int. Cl.
*A01N 1/02*    (2006.01)

(52) U.S. Cl.
CPC .................... *A01N 1/0247* (2013.01)

(58) Field of Classification Search
CPC ...................... A01N 1/0273; A01N 1/0247
See application file for complete search history.

(56)    References Cited

U.S. PATENT DOCUMENTS

| 3,892,628 A | 7/1975 | Thorne et al. |
| 4,186,565 A | 2/1980 | Toledo-Pereyra |
| 5,051,352 A | 9/1991 | Martindale et al. |
| 5,270,005 A | 12/1993 | Raible |

(Continued)

FOREIGN PATENT DOCUMENTS

| JP | H04-099701 A | 3/1992 |
| JP | H05-502060 A | 4/1993 |

(Continued)

OTHER PUBLICATIONS

Jan. 5, 2016 Office Action issued in Chinese Patent Application No. 201380046882.9.

(Continued)

*Primary Examiner* — Michael L Hobbs
(74) *Attorney, Agent, or Firm* — Oliff PLC

(57)    ABSTRACT

An apparatus for perfusing an organ or tissue includes a perfusion circuit for perfusing the organ or tissue; an oxygenator for oxygenating perfusate that circulates through the perfusion circuit; and an oxygen supply device such as an oxygen concentrator or an oxygen generator configured to supply oxygen to the oxygenator. A method of perfusing an organ or tissue includes producing oxygen from a device such as an oxygen concentrator and an oxygen generator; supplying the produced oxygen, preferably as the oxygen is produced, to a perfusate to oxygenate the perfusate; and perfusing the organ or tissue with the oxygenated perfusate. The produced oxygen preferably has a concentration greater than the oxygen concentration in air.

25 Claims, 1 Drawing Sheet

(56) References Cited

U.S. PATENT DOCUMENTS

| | | | |
|---|---|---|---|
| 5,322,500 A | | 6/1994 | Johnson et al. |
| 5,356,771 A | | 10/1994 | O'Dell |
| 5,368,555 A | | 11/1994 | Sussman et al. |
| 5,378,345 A | | 1/1995 | Taylor et al. |
| 5,494,822 A | | 2/1996 | Sadri |
| 5,586,438 A | * | 12/1996 | Fahy ............... A01N 1/02 435/284.1 |
| 6,046,046 A | | 4/2000 | Hassanein |
| 6,100,082 A | | 8/2000 | Hassanein |
| 6,110,139 A | | 8/2000 | Loubser |
| 6,673,594 B1 | | 1/2004 | Owen et al. |
| 6,953,655 B1 | | 10/2005 | Hassanein et al. |
| 7,176,015 B2 | | 2/2007 | Alford et al. |
| 7,238,165 B2 | | 7/2007 | Vincent et al. |
| 7,338,461 B2 | | 3/2008 | Linde et al. |
| 7,811,808 B2 | | 10/2010 | van der Plaats et al. |
| 7,896,834 B2 | | 3/2011 | Smisson, III et al. |
| 7,985,536 B2 | | 7/2011 | Brasile |
| 8,057,419 B2 | | 11/2011 | Ellingboe et al. |
| 3,178,041 A1 | | 5/2012 | Thomas |
| 2004/0170950 A1 | | 9/2004 | Prien |
| 2005/0147958 A1 | | 7/2005 | Hassanein et al. |
| 2005/0153271 A1 | | 7/2005 | Wenrich |
| 2006/0137522 A1 | | 6/2006 | Nishimura et al. |
| 2006/0154359 A1 | | 7/2006 | Hassanein et al. |
| 2009/0291486 A1 | | 11/2009 | Wenrich |
| 2010/0330547 A1 | * | 12/2010 | Tempelman ......... A01N 1/0226 435/1.2 |
| 2011/0236875 A1 | | 9/2011 | Lee et al. |
| 2012/0143115 A1 | | 6/2012 | Muller-Spanka et al. |
| 2012/0178150 A1 | | 7/2012 | Tempelman et al. |

FOREIGN PATENT DOCUMENTS

| | | | |
|---|---|---|---|
| JP | 2001516768 A | 10/2001 | |
| WO | 9106692 A1 | 5/1991 | |
| WO | 9915011 A1 | 4/1999 | |
| WO | 02089571 A1 | 11/2002 | |
| WO | 2007/107327 A1 | 9/2007 | |
| WO | 2010/087986 A2 | 8/2010 | |
| WO | 2012/170633 A1 | 12/2012 | |
| WO | 2013/068753 A1 | 5/2013 | |

OTHER PUBLICATIONS

Jan. 13, 2015 International Preliminary Report on Patentability issued in International Patent Application No. PCT/US2013/049594.

Jul. 8, 2013 European Search Report issued in European Patent Application No. PCT/US2013/049594.

Jul. 8, 2013 Written Opinion of the International Search Authority.

Jul. 27, 2017 Office Action issued in Chinese Patent Application No. 201380046882.9.

Feb. 21, 2017 Office Action issued in Japanese Application No. 2015-521697.

Apr. 2, 2018 Office Action issued in Chinese Patent Application No. 201380046882.9.

Apr. 30, 2019 Office Action issued in Canadian Patent Application No. 2,917,876.

Sep. 11, 2018 Office Action issued in Japanese Application No. 2015-521697.

Feb. 19, 2019 Office Action issued in Brazilian Patent Application No. BR112015000465-2.

Jun. 18, 2021 Office Action issued in Canadian Patent Application No. 2,917,876.

Jul. 5, 2021 Office Action issued in Chinese Patent Application No. 202010645950.5.

May 18, 2022 Examiner's Report issued in Canadian Patent Application No. 2,917,876.

Mar. 29, 2022 Office Action issued in Chinese Patent Application No. 202010645950.5.

\* cited by examiner

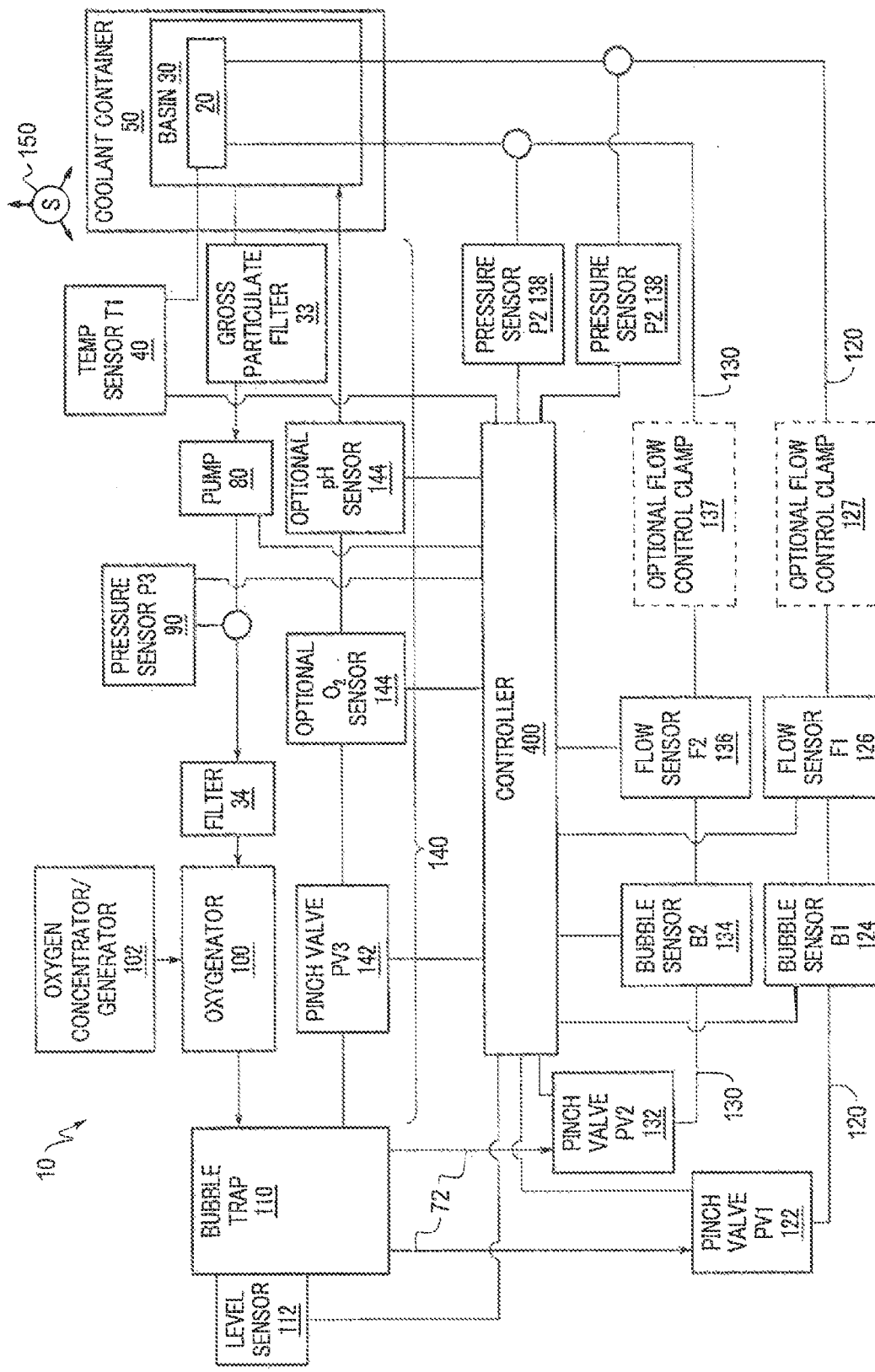

ORGAN TRANSPORTER WITH OXYGEN GENERATION

CROSS REFERENCE TO RELATED APPLICATION

This application is a continuation application of U.S. application Ser. No. 13/545,514, filed Jul. 10, 2012, the contents of which are incorporated herein by reference.

BACKGROUND

Related technical fields include organ or tissue perfusion apparatuses that are capable of sustaining and/or restoring viability of organs or tissue and preserving organs or tissues for diagnosis, treatment, storage and/or transport. For convenience, the term "organ" as used herein should be understood to mean organ and/or tissue unless otherwise specified.

It is an objective of organ perfusion apparatus to mimic the conditions of the human body such that the organ remains viable before being used for research, diagnosis, treatment or transplantation. Many times the organ needs to be stored and/or transported between facilities. A goal of sustaining and restoring organs during perfusion is to reduce ischemia and reperfusion injury. The increase in storage periods in a normal or near normal functioning state also provides certain advantages, for example, organs can be transported greater distances and there is increased time for testing, treatment and evaluation of the organs.

In maintaining organs in near ideal conditions and physiological states it is known to provide oxygenated perfusate to an organ. U.S. Pat. No. 6,673,594 discloses, for example, a configuration in which an organ is provided with perfusate that is oxygenated by way of gaseous oxygen provided to an oxygenating membrane, which is hereby incorporated by reference in its entirety and in which the present invention could be used.

SUMMARY

When an organ or tissue has been harvested, it may be beneficial to perfuse the organ with oxygenated perfusate, which may preferably be a liquid perfusate. Although perfusate can be pre-oxygenated, the perfusate may require further oxygen during the perfusion process as the organ uses oxygen from the perfusate. Accordingly, it is desirable to provide a perfusion apparatus that can supply oxygen to the perfusate so that the perfusate can be oxygenated during perfusion. However, pre-stored oxygen has drawbacks. For example, both pressurized and liquefied oxygen have serious flammability risks that can require considerable design efforts to provide adequate safety. Further, considerable logistical efforts are required to provide and maintain an adequate supply of compressed or liquefied oxygen to the point of use of a perfusion apparatus. Compressed or liquefied oxygen requires heavy containers that must be switched out when the container is empty. Extended oxygenation of perfusate may require a large container or plural small containers. Additionally, switching containers provides an opportunity to contaminate the apparatus and/or jeopardize sterility of the apparatus. Thus, disclosed herein is a perfusion apparatus that provides oxygen produced in real time to oxygenate perfusate. An organ perfusion apparatus that is able to produce oxygen to oxygenate the perfusate avoids hazards of high pressure or liquefied oxygen and also avoids logistical difficulties associated with pre-stored oxygen.

BRIEF DESCRIPTION OF THE DRAWINGS

FIG. 1 is a schematic diagram of an organ perfusion apparatus.

DETAILED DESCRIPTION OF EMBODIMENTS

According to exemplary implementations, an apparatus is provided for producing oxygen, preferably in real time, using oxygen to oxygenate a perfusate, and perfusing the organ with the oxygenated perfusate. The apparatus may include a perfusion circuit for perfusing the organ or tissue, an oxygenator for oxygenating perfusate that recirculates through the perfusion circuit; and an oxygen supply device configured to supply oxygen to the oxygenator. Preferably, the oxygen supply device is at least one member selected from the group consisting of an oxygen concentrator and an oxygen generator. As discussed herein, the term oxygen concentrator refers to a device that uses a source that includes molecular oxygen, and increases the concentration of the oxygen relative to the source; and the term oxygen generator refers to a device that uses a source other than molecular oxygen to produce oxygen from that source.

One example of an oxygen generator is a device that generates oxygen by decomposing water. Water may be decomposed by applying an electrical charge to water to break the water molecules into hydrogen and oxygen molecules. Another example of an oxygen generator (which also can be considered to decompose water) is an electrochemical device that utilizes a proton exchange membrane to generate oxygen from water such as is disclosed in U.S. Patent Application Publication No. 2010/0330547 to Tempelman et al., which is hereby incorporated by reference in its entirety. One example of an oxygen concentrator is a device that concentrates oxygen by way of pressure swing adsorption. One example of pressure swing adsorption involves passing pressurized air through an adsorbent material such as zeolite or a similar molecular sieve, which selectively adsorbs nitrogen, while allowing oxygen and argon to pass through the adsorbent material, resulting in a product with increased oxygen concentration. As another alternative, an oxygen concentrator may supply oxygen by way of a solid state oxygen pump. As used herein, a solid state oxygen pump refers to a device that passes only oxygen through a ceramic or similar material by applying an electric potential which disassociates oxygen molecules into two oxygen ions, drives the ions across the ceramic, and allows the ions to re-associate as an oxygen molecule. Thus, oxygen can be extracted from air, increasing oxygen concentration. This process is essentially driving a ceramic oxygen sensor in reverse.

Oxygen concentrators such as pressure swing adsorption devices and solid state oxygen pumps may use air as an input; the air may be stored, compressed prior to use, and/or drawn from the ambient atmosphere. The apparatus may or may not include a container to store the source used to generate or concentrate the oxygen. For example, the apparatus may include a container to store air such as a pressurized air tank. Similarly, a water tank may be provided for an oxygen generator that decomposes water.

Exemplary implementations may include a method of perfusing an organ or tissue. Such a method may include producing oxygen using at least one device selected from the group consisting of an oxygen concentrator and an oxygen generator, supplying the produced oxygen, preferably as the oxygen is produced, to a perfusate to oxygenate the perfusate, and perfusing the organ or tissue with the oxygenated perfusate. Preferably, the produced oxygen has a concentration greater than the oxygen concentration in air. Any of the devices discussed above, or other devices, may be used in exemplary implementations.

FIG. 1 is a schematic diagram of an exemplary perfusion apparatus 10 for an organ 20. The organ 20 may preferably be a liver, kidney, heart, lung or intestine, but may be any human or animal, natural or engineered, healthy, injured or diseased organ or tissue. The apparatus includes a basin 30 in which the organ may be placed. The basin 30 may hold a cradle on which the organ 20 is disposed when the organ 20 is in the apparatus 10. The basin 30 may include a first filter 33 that can function as a gross particulate filter. The basin 30 and/or the cradle are preferably configured to allow a perfusate bath to form around the organ 20. The basin 30 or apparatus 10 may also include a temperature sensor 40 located or focused in or near the cradle. The basin 30 or apparatus 10 may include multiple temperature sensors 40, which may provide redundancy in the event of a failure and/or may provide temperature measurement at multiple locations. Preferably, the temperature sensor(s) 40 is an infrared temperature sensor. The temperature sensor(s) 40 is preferably disposed as close as practical to the organ 20 when the organ 20 is disposed in the cradle in order to improve usefulness and accuracy of the temperature sensors 40, which preferably provide a temperature measurement of the perfusate that may be correlated to a temperature of the organ 20. Alternatively or additionally, the temperature sensor(s) 40 may be used to directly measure the temperature of the organ 20.

The basin 30 is preferably disposed within a recess of an insulating coolant container 50 that may contain cold materials such as ice, ice water, brine or the like. Coolant container 50 may be permanently or removably attached to, or an integral, monolithic part of, apparatus 10. Thus, in use, the organ 20 is disposed within the cradle, which is disposed within the basin 30, which is disposed within the coolant container 50. The configuration of the coolant container 50, basin 30 and cradle preferably provides a configuration that provides cooling for the organ 20 without the contents of coolant container 50 contacting the organ 20 or the cradle. Although the coolant container 50 is described herein as containing ice or ice water, any suitable cooling medium can be used. Ice or ice water may be preferable due to the ease with which ice can procured, but one of ordinary skill would understand that any suitable cooling medium, which could be an active cooling medium (such as a thermo electric cooler or a refrigerant loop) or a passive cooling medium similar to ice or ice water, or a combination thereof, may be utilized. The amount of ice, or other cooling medium, that can be placed within the coolant container 50 should be determined based upon the maximum time that cooling is to be provided while the organ 20 will be in the apparatus 10.

The cradle may include components configured to securely restrain the organ 20 in place. Such components may, for example, include user selectable netting that is fastened to the cradle. The user selectable netting keeps the organ 20 in place while the organ 20 is manipulated or moved. For example, the organ may be held in place with the netting on the cradle while being manipulated (e.g., vasculature trimmed, cannulas attached, or the like) before being placed in the basin or perfusion apparatus. Similarly, the organ may be held in place when the organ 20 is moved with the cradle into the basin 30, when the basin 30 is moved into the coolant container 50 and when the apparatus 10 itself is moved during transport.

In the exemplary perfusion apparatus 10 of FIG. 1, after passing through the filter 33, the perfusate flows along a first flow path 70 that includes a suitable fluid conduit 72, such as flexible or rigid tubing, a pump 80, a pressure sensor 90, a second filter 34, an oxygenator 100 and a bubble trap 110, each of which is discussed below. In combination with one or both of the portal flow path 120 and the hepatic flow path 130 (discussed below), the first flow path 70 may form a recirculating perfusate flow path that provides perfusate to the organ 20 and then recirculates the perfusate.

The first filter 33 is preferably a relatively coarse filter (relative to the second filter 34). Such a coarse filter may be provided to prevent large particles, which may for example be byproducts of the organ or of the organ being removed from the donor, from entering and clogging fluid paths of the apparatus 10. The first filter 33 may be an integral part of the basin 30 or the first filter 33 may be disposed elsewhere in the first flow path 70 downstream of the basin 30. For example, the first filter 33 may also be a separate component from the basin 30 or disposed within the fluid conduit 72.

The first flow path 70 may also include a pump 80. The pump 80 may be any pump that is suitable in connection with perfusing of organs. Examples of suitable pumps may include hand operated pumps, centrifugal pumps and roller pumps. If a roller pump is included, the roller pump may include a single channel or flow path (where only one tube is compressed by the rollers) or the roller pump may include multiple, parallel channels or flow paths (where multiple tubes are compressed by the rollers). If multiple, parallel channels or flow paths are included, the rollers may preferably be disposed out of phase or offset so that pulses created by the rollers are out of phase, which may result in a fluid flow out of the roller pump that is relatively less pulsatile than would be the case with a single roller. Such a multiple channel roller pump may achieve a constant flow rate or a minimally pulsatile flow rate, which may be advantageous depending on the other components in the flow path and/or the type of organ being perfused.

The flow path 70 may include a pressure sensor 90. The pressure sensor 90 may preferably be disposed after the outlet of the pump 80 in order to monitor and/or be used to control the pressure produced at the outlet of the pump by way of a suitable controller 400. The pressure sensor 90 may provide continuous or periodic monitoring of pressure.

The flow path 70 may include an oxygenator 100 such as an oxygenator membrane or body to provide oxygenation to the perfusate. The oxygen may be provided by way of an oxygen generator or oxygen concentrator 102 as shown in FIG. 1, which may be separate from the apparatus 10 or integral to the apparatus 10. For example, the oxygen generator or concentrator 102 may be contained within the apparatus 10 or the oxygen generator or concentrator 102 may be an external device that can be connected to the apparatus to supply oxygen to the apparatus. Oxygen may be generated through any suitable means, some examples of which include through pressure swing adsorption using a molecular sieve (such as a zeolite), through a ceramic oxygen generator (a solid state oxygen pump) or through decomposition of water. Each type of oxygen generator or concentrator 102 discussed above may be adapted to be separate from or integral to the apparatus 10; however, some devices may be more advantageously adapted to be integral or separate. For example, an electrochemical oxygen generator may be relatively compact (on the order of a few cubic inches including a water reservoir) and therefore well suited to being integral, whereas a pressure swing adsorption device may be relatively large (due to the size of adsorbent material containers and need for a pressurized air source, such as a compressor) and therefore well suited to be separate.

The oxygen generator or concentrator 102 preferably produces oxygen in real time to provide oxygenation to the perfusate, but oxygen may also be produced and stored for short or long periods as dictated by the oxygen consumption requirements and the technology selected for producing oxygen. The oxygen generator or concentrator 102 may continuously or non-continuously produce oxygen depending on the need to oxygenate perfusate and/or the type of device used to produce the oxygen. The apparatus 10 may be configured such that there is no oxygen storage for oxygen produced from the oxygen generator or concentrator 102, except for any residual oxygen contained within plumbing or a conduit(s) from an outlet of the oxygen generator or concentrator 102 to the oxygenator 100. In other words, it may be preferable that the apparatus 10 does not include any structures specifically configured for oxygen storage. The apparatus 10 may include a device, such as a microbial filter, to ensure sterility, or otherwise prevent contamination, of the oxygen supplied to the oxygenator. Preferably such a device is located between the oxygen generator or concentrator 102 and the oxygenator 100, but may also be upstream of the oxygen generator or concentrator 102 or in both locations. Preferably, any device utilized to ensure sterility, or otherwise prevent contamination, of the oxygen supply is a disposable component. As would be appreciated by one of ordinary skill, any suitable device to ensure sterility of, or prevent contamination of, the oxygen may be provided instead of a microbial filter.

The flow path 70 may include a bubble trap 110. The bubble trap 110 preferably separates gas bubbles that may be entrained in the perfusate flow and prevents such bubbles from continuing downstream and entering the organ 20. The bubble trap 110 may also function as an accumulator that reduces or eliminates pulsatility of the perfusate flow. The bubble trap 110 may include a volume of gas, initially or through the accumulation of bubbles, such that pressure fluctuations in the perfusate are dampened or eliminated.

The bubble trap 110 may include a vent that allows purging of gas during start up or a purging process. The vent may be connected to or part of purge flow path 140 (which is discussed in detail below). The vent is preferably open during a start up process so that any air or other gas may be purged from the perfusate path 70. Once the gas is purged from the perfusate path 70, the vent may preferably be closed. The vent may be closed manually or may be closed automatically by way of controller 400.

The bubble trap 110 may include a level sensor 112. A level sensor 112 may optionally be used during the purging process to determine when the purging is complete and/or may be used to determine when the purging process needs to be repeated, which may happen after bubbles have been trapped in the bubble trap 110. Also, through the use of the level sensor 112 and the vent, the accumulator function of the bubble trap can be tuned to account for differing amplitudes and frequencies of pulsatility in the perfusate flow.

The bubble trap 110 may have any number of outlets, as needed for a given application of the perfusion apparatus. In FIG. 1, three outlets are shown connected to three different flow paths, which may be particularly suited for the perfusion of a liver. When perfusing a liver, the three paths preferably include portal flow path 120 connected to the portal vein of a liver, hepatic flow path 130 connected to the hepatic artery of a liver, and bypass flow path 140 that provides a return path to the basin 30. There may also be a port in any fluid path that allows fluid access to the perfusate solution. The port may preferably be located in the bubble trap 110. This port may preferably include a luer type fitting such that a user may extract a small a sample of the perfusate for analysis. The port may also be utilized by a user to administer substances to the perfusate without opening the basin. Although FIG. 1 illustrates a single oxygenator 100 and single bubble trap 110, one of ordinary skill would appreciate that more than one oxygenator 100 and/or bubble trap 110 may be provided. For example, an oxygenator 100 and a bubble trap 110 could be provided for each of the portal flow path 120 and the hepatic flow path 130. Such a configuration may allow for different levels of oxygenation in each of the portal flow path 120 and hepatic flow path 130. A single oxygen concentrator or generator 102 may provide oxygen to both the portal flow path 120 and the hepatic flow path 130, or separate oxygen concentrators or generators 102 may be provided for each flow path. If a single oxygen concentrator or generator 102 provides oxygen to both flow paths, suitable valves such as on/off valves and/or pressure regulators may control the oxygen supplied to each flow path to be different.

As shown in FIG. 1, the portal flow path 120 and hepatic flow path 130 may optionally include similar or different components such as valves 122, 132; bubble sensors 124, 134; flow sensors 126, 136; flow control clamps 127, 137; and pressure sensors 128, 138. Each similar component may function in a similar manner, and such pairs of components may optionally be structurally and/or functionally identical to reduce manufacturing costs. Flow sensors 126, 136 may preferably be ultrasonic sensors disposed around tubing, although any suitable sensor may be used. Ultrasonic sensors may be advantageous because in normal usage such sensors do not come into contact with the perfusate and therefore are not in the sterile path. Such an implementation of ultrasonic sensors does not require replacement and/or cleaning after use.

Valves 122, 132 may be pinch valves that function to squeeze tubing and reduce or shut off flow, but any suitable valve may be used. Pinch valves may be advantageous because in normal usage they do not come into contact with the perfusate and therefore do not require replacement and/or cleaning after use.

Preferably, the bubble sensors 124, 134 are ultrasonic sensors disposed around tubing, although any suitable sensor may be used. Similar to pinch valves, ultrasonic sensors may be advantageous because in normal usage they do not come into contact with the perfusate and therefore do not require replacement and/or cleaning after use. Instead, ultrasonic sensors can be disposed in contact with, adjacent to or around an external surface of tubing in order to sense bubbles.

Flow control clamps 127, 137 may be used to fine-tune the flow rate in one or both of portal flow path 120 and hepatic flow path 130. Preferably, the organ provides self-regulation to control an amount of flow that exits the bubble trap 110 and is divided between the portal flow path 120 and the hepatic flow path 130. In such self regulated flow, pressure sensors 128, 138 provide overpressure monitoring. In the event that pressure delivered to the organ in either or both of the portal flow path 120 or the hepatic flow path 130 exceeds a predetermined threshold, the apparatus 10 can automatically stop and/or reduce the flow rate provided by the pump 80 to prevent damage to the organ. In addition or alternatively, the pressure sensors 128, 138 may be used to generate warning signals to the user and/or to an appropriate controller as pressures approach the predetermined threshold.

After exiting one or both of the portal flow path 120 and hepatic flow path 130, pefusate flows through the organ and returns to the basin 30 to form an organ bath.

Bypass flow path 140 may include a valve 142, and/or sensors such as oxygen sensor 144 and pH sensor 146. Preferably, the valve 142 is a pinch valve and may be of similar configuration to valves 122 and 132, but any suitable valve may be used. The oxygen sensor 144 and the pH sensor 146 may be used to determine the state of the perfusate. Preferably, the bypass flow path 146 is only used during a purging or priming process, although it may also be used during perfusion, preferably continuously, to monitor perfusate properties in real time.

The organ perfusion apparatus 10 may also include an accelerometer 150. Preferably the accelerometer 150 is a three-axis accelerometer, although multiple single axis accelerometers may be used to the same effect. The accelerometer 150 may be used to continuously or periodically monitor and/or record the state of the apparatus 10. Monitoring may include monitoring for excessive shocks as well as attitude of the apparatus 10. By implementing such monitoring, misuse or potentially inappropriate conditions of the apparatus 10 can be detected and recorded.

The apparatus 10 may include storage compartments for items other than the organ 20. For example, the apparatus 10 may include a document compartment to store documents and/or charts related to the organ 20. Also, the apparatus 10 may include one or more sample compartment. The sample compartment may be configured, for example, to store fluid and/or tissue samples. The sample compartment may be advantageously disposed near the coolant container 50 to provide cooling, which may be similar or equivalent to the cooling provided for the organ 20.

The apparatus 10 may include one or more tamper evident closures. A tamper evident closure may be used to alert a user that the apparatus 10 has been opened at an unauthorized time and/or location and/or by an unauthorized person. Evidence of tampering may alert the user to perform additional testing, screening, or the like before using the organ 20 and/or the apparatus 10.

The organ transporter is preferably portable for carrying organs or tissues from place to place, and is sized to be carried by one or two persons and loaded into an automobile or small airplane. The perfusion apparatus 10 preferably may be an organ transporter that is designed to be portable, for example, having dimensions smaller than length 42 inches×width 18 inches×height 14 inches and a weight less than 90 lbs, which includes the weight of the complete loaded system (for example, transporter, disposable components, organ, ice and 3 liters of perfusate solution).

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention.

What is claimed is:

1. An apparatus for perfusing an organ or tissue, the apparatus comprising:
    a perfusion circuit (i) comprising a plurality of flow paths by which liquid perfusate may flow to the organ or tissue and (ii) configured to perfuse the organ or tissue with the liquid perfusate so that perfusate flow in the plurality of flow paths is self-regulated by the organ or tissue;
    either:
        (i) an oxygenator, which is connected to the perfusion circuit and is configured to supply oxygen to each of the perfusate flow paths, and at least one on/off valve or pressure regulator, which is configured to control an amount of oxygen supplied to each of the perfusate flow paths to be different; or
        (ii) a plurality of oxygenators connected to the perfusion circuit and configured to supply oxygen to each of the perfusate flow paths, a separate one of the plurality of oxygenators being provided for each of the plurality of flow paths;
    an oxygen supply device that is external to and separable from the remainder of the apparatus and that is configured to supply produced oxygen to the oxygenator or the plurality of oxygenators; and
    an accumulator configured to reduce pulsatility of the perfusate flow in the plurality of flow paths,
    wherein (i) the oxygenator and the at least one on/off valve or pressure regulator or (ii) the plurality of oxygenators are configured to supply oxygen to each of the perfusate flow paths such that (a) the amount of oxygen supplied to each of the perfusate flow paths is separately controllable and (b) the liquid perfusate in a first flow path of the perfusate flow paths has a different level of oxygenation than the liquid perfusate in a second flow path of the perfusate flow paths, and
    wherein the oxygenator or the plurality of oxygenators is configured to oxygenate the perfusate as the oxygen is produced.

2. The apparatus according to claim 1, wherein the oxygenator or the plurality of oxygenators is configured to oxygenate the perfusate after the perfusing of the organ or tissue.

3. The apparatus according to claim 1, wherein oxygen is not stored in the apparatus.

4. The apparatus according to claim 1, wherein the produced oxygen has a concentration greater than the oxygen concentration of air.

5. The apparatus according to claim 1, wherein the oxygen supply device is configured to supply the produced oxygen by starting with an oxygen supply with relatively low oxygen concentration and outputting oxygen with a concentration that is higher relative to the oxygen supply.

6. The apparatus according to claim 5, wherein the oxygen supply device is configured to operate with the oxygen supply being air.

7. The apparatus according to claim 6, wherein the air is compressed air.

8. The apparatus according to claim 6, wherein the air is ambient air.

9. The apparatus according to claim 5, wherein the oxygen supply device is configured to operate with the oxygen supply being water.

10. The apparatus according to claim 1, wherein the oxygen supply device is configured to supply the produced oxygen based on feedback detected from the organ or tissue.

11. The apparatus according to claim 5, wherein
    the accumulator is a bubble trap disposed within the perfusion circuit downstream of the oxygenator or the plurality of oxygenators relative to a direction of perfusate flow.

12. The apparatus according to claim 1, wherein the apparatus does not include an oxygen storage device.

13. The apparatus according to claim 1, wherein the apparatus is transportable and weighs less than 90 pounds.

14. The apparatus according to claim 1, wherein the apparatus is configured to sterilize or prevent contamination of the produced oxygen supplied by the oxygen supply device.

15. A method of perfusing an organ or tissue with a portable perfusion apparatus, the method comprising:
produce oxygen from an oxygen supply device that is external to and separable from the remainder of the perfusion apparatus;
supplying the oxygen, as the oxygen is produced, to a plurality of perfusate flow paths by which liquid perfusate may flow to the organ or tissue;
controlling either (i) an oxygenator, which is configured to supply oxygen to each of the perfusate flow paths, and at least one on/off valve or pressure regulator, which is configured to control an amount of oxygen supplied to each of the perfusate flow paths to be different, or (ii) a plurality of oxygenators configured to supply oxygen to each of the perfusate flow paths, a separate one of the plurality of oxygenators being provided for each of the plurality of flow paths, such that (i) the amount of oxygen supplied to each of the perfusate flow paths is separately controllable and (ii) the liquid perfusate in a first flow path of the perfusate flow paths has a different level of oxygenation than the liquid perfusate in a second flow path of the perfusate flow paths;
reducing pulsatility of perfusate flow in the plurality of flow paths by way of an accumulator; and
perfusing the organ or tissue with the perfusate so that the perfusate flow in the plurality of flow paths is self-regulated by the organ or tissue,
wherein the oxygen has a concentration greater than the oxygen concentration in air and the perfusate is recirculated.

16. The method according the claim 15, wherein the oxygen is supplied to the perfusate after the perfusing of the organ or tissue.

17. The method according to claim 15, wherein the oxygen is produced from water.

18. The method according the claim 15, wherein the oxygen is supplied based on feedback detected from the organ or tissue.

19. The method according to claim 15, wherein the oxygen is produced on board the portable organ perfusion apparatus.

20. The method according to claim 15, wherein the oxygen is produced by starting with an oxygen supply with relatively low oxygen concentration and outputting the oxygen with a concentration that is higher relative to the oxygen supply.

21. The apparatus according to claim 1, wherein the oxygen supply device is an oxygen generator that supplies oxygen by decomposing water, and the apparatus further comprises a water tank configured to hold water and supply the water to the oxygen generator.

22. The apparatus according to claim 1, further comprising a microbial filter located between (i) the oxygen supply device and (ii) the oxygenator or the plurality of oxygenators to ensure sterility of the oxygen supplied to the oxygenator.

23. The method according the claim 15, wherein the oxygen is supplied non-continuously.

24. The apparatus according to claim 1, wherein the apparatus is configured so that the amount of oxygen supplied to each of the perfusate flow paths is different.

25. The method according to claim 15, wherein the amount of oxygen supplied to each of the perfusate flow paths is different.

* * * * *